(No Model.) 4 Sheets—Sheet 1.
T. C. CADWGAN.
COTTON PLANTER.

No. 466,487. Patented Jan. 5, 1892.

WITNESSES
H. M. Plaisted
J. G. Dawley

INVENTOR
Thos. C. Cadwgan,
By H. A. Toulmin,
his Attorney.

(No Model.) 4 Sheets—Sheet 2.

T. C. CADWGAN.
COTTON PLANTER.

No. 466,487. Patented Jan. 5, 1892.

WITNESSES
H. M. Plaisted.
J. C. Dawley

INVENTOR
Thomas C. Cadwgan,
By H. A. Toulmin,
his Attorney.

(No Model.) 4 Sheets—Sheet 3.

T. C. CADWGAN.
COTTON PLANTER.

No. 466,487. Patented Jan. 5, 1892.

WITNESSES
H. M. Plaisted.
J. C. Rawley.

INVENTOR
Thomas C. Cadwgan,
By H. A. Toulmin,
his Attorney.

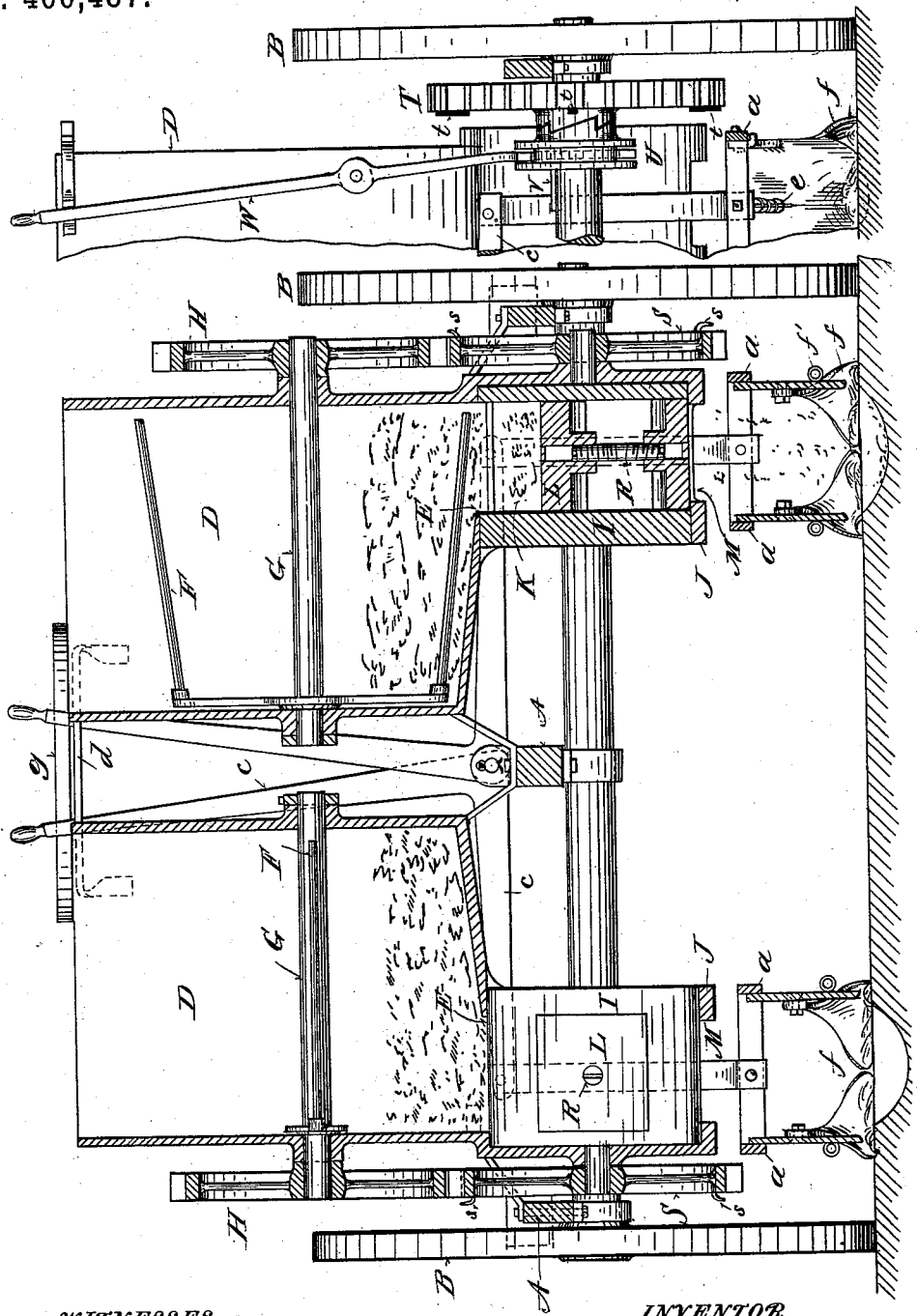

# UNITED STATES PATENT OFFICE.

THOMAS C. CADWGAN, OF ANDERSON, INDIANA.

COTTON-PLANTER.

SPECIFICATION forming part of Letters Patent No. 466,487, dated January 5, 1892.

Application filed July 22, 1891. Serial No. 400,272. (No model.)

*To all whom it may concern:*

Be it known that I, THOMAS C. CADWGAN, a citizen of the United States, residing at Anderson, in the county of Madison and State of Indiana, have invented certain new and useful Improvements in Cotton-Planters, of which the following is a specification, reference being had therein to the accompanying drawings.

My invention relates to certain new and useful improvements in cotton-planters, the peculiarities of which will be hereinafter fully described, and pointed out in the claims.

Figure 1:
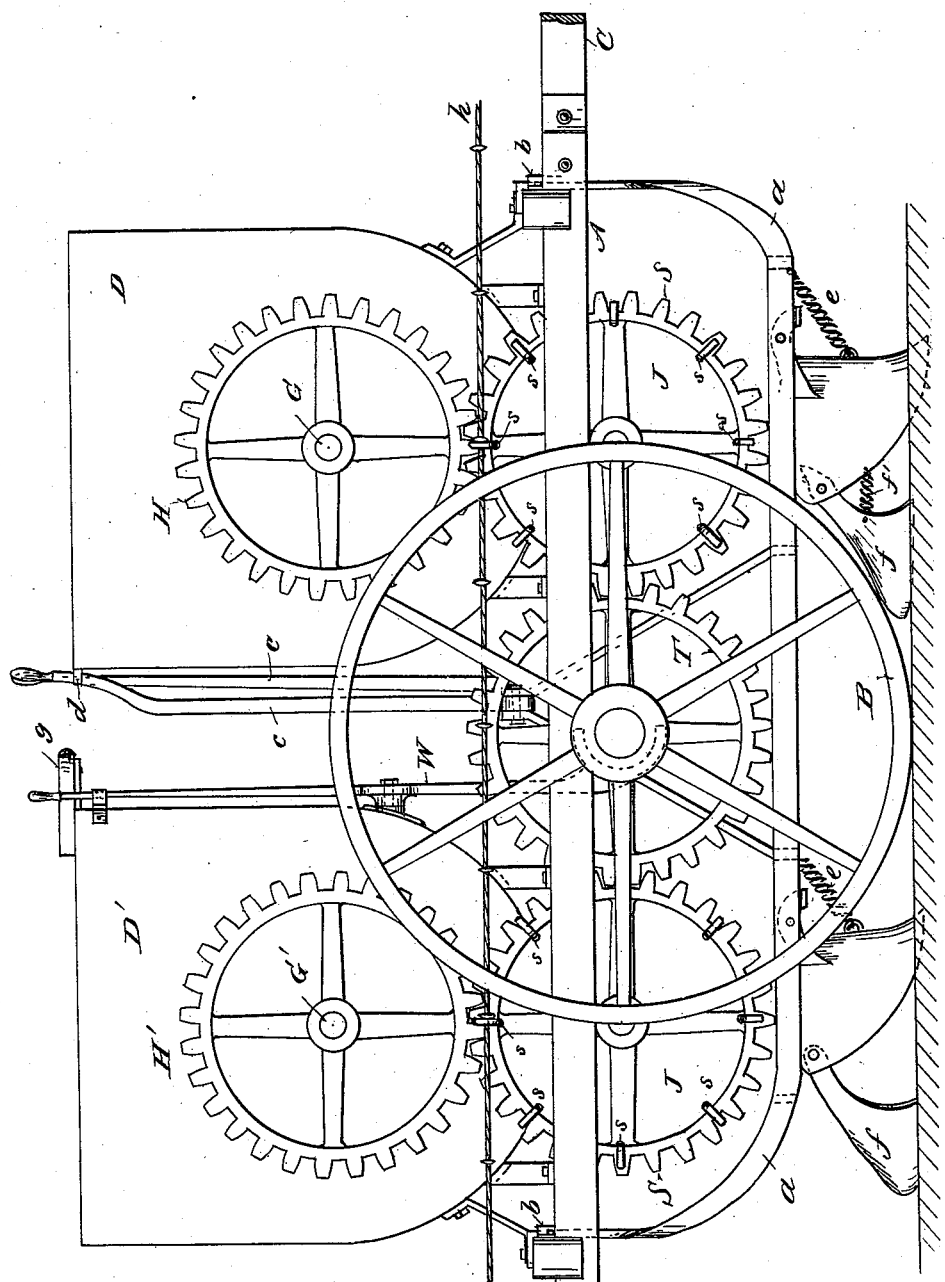
Figure 2:
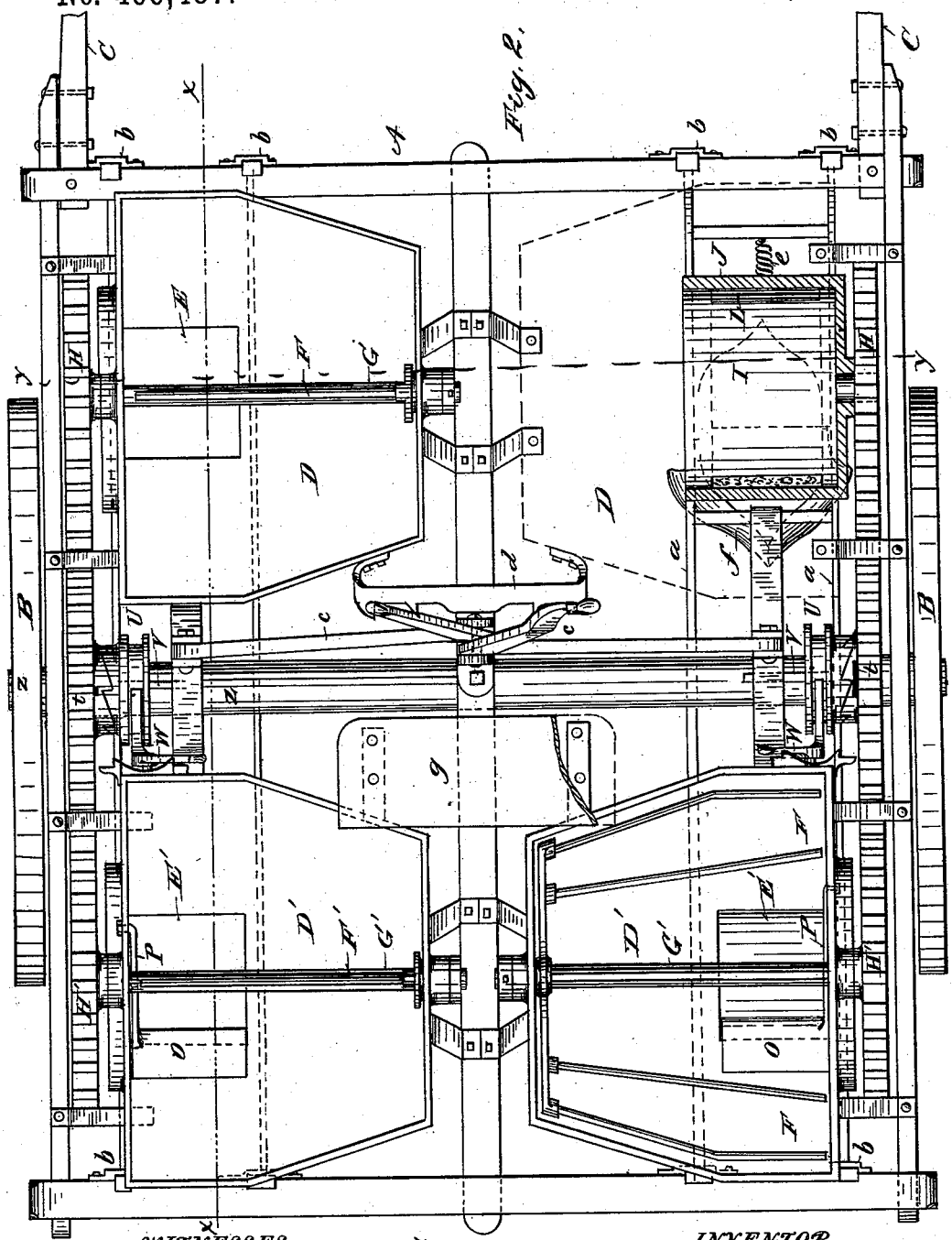
Figure 3:
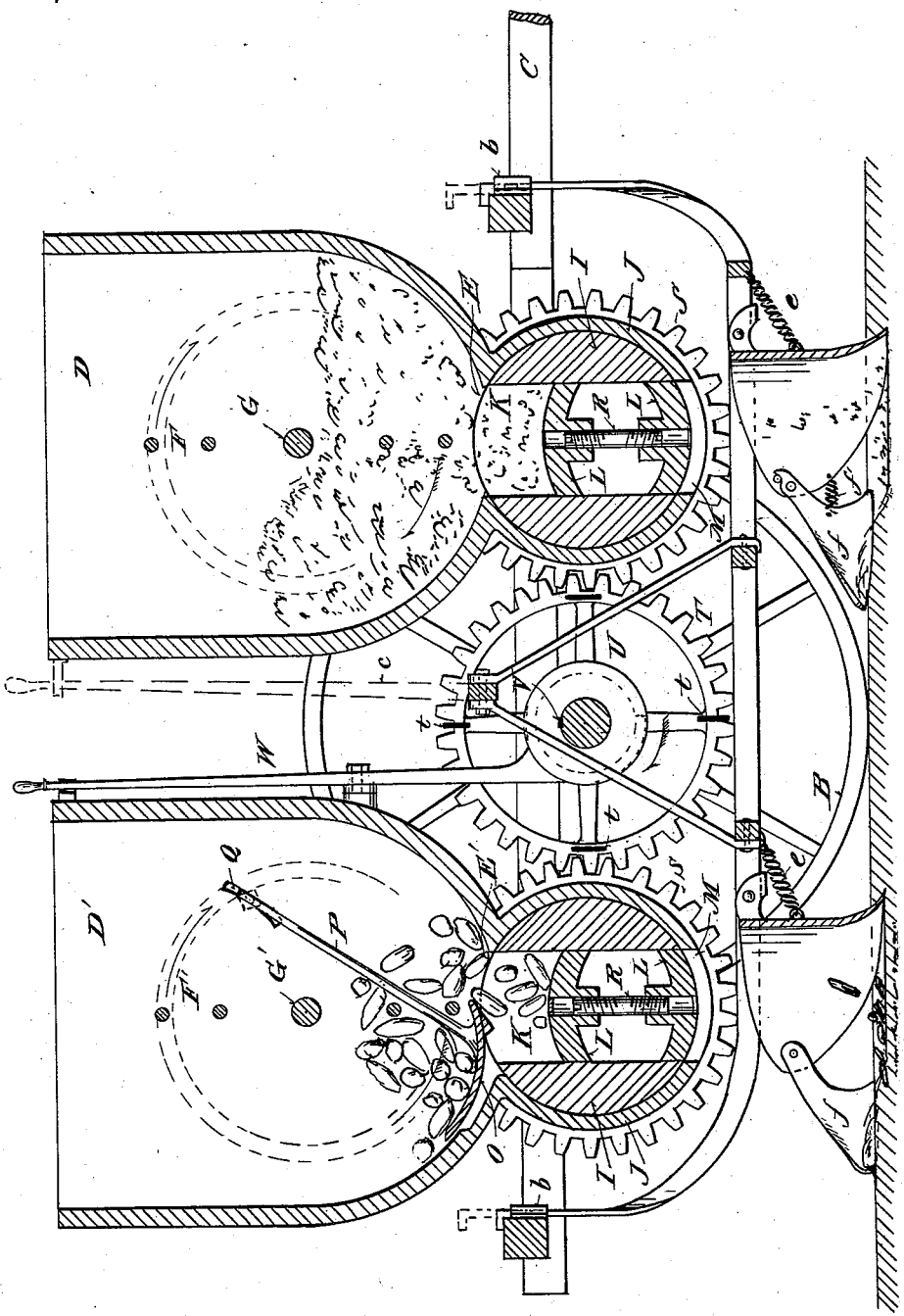

In the accompanying drawings, on which like reference-letters indicate corresponding parts, Figure 1 represents a side view of my cotton-planter; Fig. 2, a plan view of the same; Fig. 3, a vertical longitudinal section on the line $x$ $x$ of Fig. 2; Fig. 4, a vertical transverse section on the line $y$ $y$ of Fig. 2, and Fig. 5 a similar partial section showing the clutch mechanism.

The letter A designates a suitable framework of rectangular or other construction mounted on carrying-wheels B and provided with shafts C, whereby the draft-animal may give motion thereto. Upon this frame are mounted receptacles for the fertilizing material and for the seed to be planted. I have preferred to illustrate and describe four of such receptacles, the same consisting of two pairs D D', the forward one D of each pair being the fertilizer-receptacle and rear one D' the seed-receptacle. By this arrangement I can plant two rows at once, and by suitable mechanism, hereinafter described, such rows may be either opposite or check rows in the arrangement of the hills planted thereby, the term "opposite" being applied to said rows when the hills are formed opposite to each other and at the same time, and the term "check-row" to hills formed alternately in adjacent rows as the planting proceeds. It is evident that but one pair of said receptacles may be mounted in a machine, or that more than two pairs may be thus mounted, whereby one or a plurality of rows may be planted as the machine proceeds. These receptacles D D' are each provided with an inclined bottom adapted to deliver the contents thereof into openings E E' in the bottom, and may be uniform in size and construction, as shown, to facilitate the manufacture and use of the same in combining them in the machine. Agitators are provided for each pair of receptacles, consisting of forks F F', carried by the shafts G G', mounted in bearings and rotated through gears H H' to assist the discharge of fertilizer and seed, respectively, from the said receptacles.

In order to effect the deposit of the fertilizer and seed in suitable quantities, a feeder is provided for each receptacle, and the form illustrated and now to be described may be used for feeding both fertilizer and seed, but is specially adapted to feed the seed.

A cylinder I, mounted in a suitable casing J, supported beneath the corresponding receptacle, is provided with a transverse opening K, in which is mounted a dropper L, adapted to reciprocate back and forth in said opening preferably by the action of gravity as the cylinder I rotates, whereby the material deposited in said opening K above the dropper is ejected or discharged therefrom when the cylinder in its rotation brings the material below the dropper, and the weight of which forces it out through the opening M in the bottom of the said casing J. When this feeder is used for the seed-receptacle, a yielding abutment is preferably provided, consisting of a cover O, supported by a spring P or otherwise so as to cover more or less of the opening E' in the bottom of the seed-receptacle, and thus regulate the escape of seed therefrom. One means of adjustment of said cover is by adjusting the support P in different positions in a groove or slot Q, which thus throws the cover O back and forth, according to the adjustment of the support P therein. The cylinder I is rotated, by means presently to be described, in the direction of the arrow, Fig. 3, and in shutting off the entrance of the seed to the opening K the abutment will yield to the seed pressed against the same and force the seed into the receptacle without crushing it instead of shearing the seed between the sharp edges of the openings E' and K, as would otherwise be likely to occur. The feeder for the fertilizer receptacle need not be provided with a yielding abutment, and in some kinds of seed—such as corn, wheat, &c., of harder consistency than that of cotton-seed—the said abutment may be dispensed with. In cotton-seed and other seed of light spongy consistency this yielding abutment prevents a crushing and destruction of the seed which might otherwise occur. The opening K is partly filled by the said dropper L, as above suggested, and the size of the dropper will determine the amount of the seed or other material deposited. I have shown one means of varying the size of said dropper by means of an adjusting-screw R, connecting the arched portions of the dropper. Any other means may be employed to vary the size of the dropper, and thus the amount of the seed or other material deposited. Each cylinder is provided with a gear S, meshing with the corresponding gear H or H' of the said receptacle and connected by a driving-gear T, loosely mounted upon the shaft of the carrying-wheels B and adapted to rotate therewith by means of a clutch U, slidingly mounted on said shaft and connected thereto by a feather key V, or otherwise, and adapted to be axially adjusted to engage with or disengage from said driving-gear T by means of a handle-lever W connected to the clutch by a yoke and groove, respectively, whereby the adjustment of the handle back and forth will cause the rotation of the driving-gear T or silence the same and its connecting-gears. By changing the relative meshing engagement of the fertilizer and seed feeding gears with said driving-gear T the seed will be dropped at a suitable interval after the fertilizer in order to deposit the former above the latter.

A pair of plows or hoes is provided for each pair of receptacles, the said hoes being pivoted to a suitable hanger-frame, consisting of bars a, adapted to be adjusted up and down in guides b, secured to the frame A or otherwise by means of levers c, connected thereto and provided with a notched rack d, whereby the hoes may be raised out of the ground or adjusted to an operative depth therein. Each hoe is provided with a spring e, as shown in Fig. 1, to allow of the point of the hoe rising from the ground in passing over an obstruction, to avoid breakage thereof. A cover is provided for each hoe consisting of a double blade or wing-shaped piece f, adapted to engage with the ground and fill the furrow immediately after it is made by the hoe. A spring f' may assist the coverer in its action, if so desired.

Referring to Figs. 1 and 3, it will be seen that the forward hoe operates to a greater depth than the rear hoe in each pair. The ground will first be plowed to a depth of, say, four inches, by the forward hoe, the fertilizer dropped therein at suitable intervals and covered. The rear hoe following thereafter will plow to a lesser depth, say, to two inches, the seed will be dropped at suitable intervals and fall above the fertilizer, and be covered by the coverer of the rear hoe, whereby a layer of earth, say, two inches in thickness, is interposed between the fertilizer and the seed in each hill. This is illustrated in Fig. 3, the fertilizer being shown in the act of being deposited and covered by the forward hoe, and the seed at the rear hoe deposited above the fertilizer and covered, the two being separated by a layer of earth. The fertilizer is thus put where it will do the most good, and being separated from the seed the latter will not be rotted or destroyed by the strength of the former while it will receive the full benefit of it.

Referring to Fig. 4, which shows the two forward feeders, it will be seen that the one on the right is depositing its material while the latter has made but a quarter-turn. The hills will therefore be planted alternately, or in check-row style. When it is wished that they should plant in parallel rows or opposite hills, it is only necessary to unclutch the driving-gear T on one side till the feeder-cylinders are going in unison and their droppers parallel. Fig. 2 shows the material being taken by one pair of feeders, while the other pair has made a quarter-revolution corresponding to Fig. 4.

In order to show the driver from his seat g whether the machine is planting opposite or check row, each driving-gear T may be provided with two or more designating-marks t, which may differ from each other on the same gear, so that when the machine is operating and similar marks come upward at the same time they will show that the machine is planting opposite hills. When different marks appear at the same time on the tops of said gears the machine is planting in check-row style.

It may be desired to operate the feeders by means of the usual knotted cord extending across the field instead of by the automatic gear mechanism above described. In Fig. 1 I have shown said cord h as adapted to operate to said feeders by means of projections or hooks s, carried by the gears S, whereby the said gears are rotated and the connecting mechanism operated, the driving mechanism being meanwhile unclutched and revolving loosely on its shaft.

Thus it will be seen that the machine may be operated to drop the fertilizer and seed at suitable intervals in hills either opposite or diagonal to each other, an interposed layer of earth being provided between the fertilizer and seed in each hill; that the amount of the material thus dropped may be regulated and positively fed by gravitating action; that the seed is compressed within the pocket K and prevented from injury by the yielding abutment therefor; that the seed or the fertilizer is ejected from the pocket by the weight of the dropper, preferably without any spring action thereof; that the operation of said droppers is indicated by a suitable mark to the driver, and that the automatic action of the feeders is effected by clutching mechanism with the carrying-shaft or by the ordinary knotted cord across the field.

As above suggested, this planter may be used for other than cotton-seed when so desired, but is described and shown as adapted for a cotton-planter, because of the natural difficulty in planting cotton-seed.

While I have used the term "gears" to designate the interconnecting mechanism between the feeders and receptacles, yet their equivalents—sprockets and sprocket-chains or pulleys and belts—may be used.

I wish to be understood as laying claim, broadly, to the gravity dropper or feeder mechanism operated by gravity, and do not wish to limit myself to the exact form of construction nor of the means herein shown and described, whereby the results desired are attained.

Another means whereby the size of the pocket K and the resulting quantity of seed or fertilizer may be varied is by inserting blocks of different sizes within the transverse opening, thus taking up more or less of the same and correspondingly decreasing or increasing the space left to form the pocket. It will be observed that the discharge-opening of the receptacle or hopper will allow of removing the dropper-block and inserting the same within the transverse opening of the feed-cylinder, while the discharge-opening of the casing forming the bearing for the cylinder is adapted to prevent the block from slipping through the same. This is clearly shown in Fig. 4.

I am aware that ejectors operated by springs to throw out the seeds or fertilizer and also recesses of a variable size to receive and deliver the seed by its own weight have been previously employed, and I do not therefore claim such broadly.

Having thus fully described my invention, what I claim as new, and desire to secure by Letters Patent, is—

1. In a cotton-planter, a rotatable member having a transverse opening or recess, a movable piece mounted in said opening or recess and constructed to operate inward and outward by gravity alone as the rotatable member carries said piece above and below the axis, bearings for said rotatable member, and means to rotate it therein.

2. In a cotton-planter, the combination, with a carrying-frame, of a feeding device consisting of a rotatable cylinder having a tranverse opening, bearings for said cylinder, and a slidable piece mounted in said opening and adapted to gravitate back and forth therein without other operative connections, a feed-receptacle mounted above and discharging into said feeding device, a hoe and coverer carried below said feeding device, and means to rotate said cylinder to deliver the feed between the hoe and coverer.

3. In a cotton-planter, the combination, with a seed-receptacle having a discharge-opening, and a movable feeder mounted beneath and adapted to move across said opening, of a spring-supported cover or piece mounted at said discharge-opening to constitute one edge thereof, the spring being adjustably supported to allow of varying the normal size of said opening, whereby the said coverer may be sprung back by edgewise pressure to the side thereof as it is carried onward by the movable feeder, and the normal size of said entrance-opening may be varied.

4. In a cotton-planter, the combination, with a carrying-frame and driving-shaft, a clutch-gear loosely mounted thereon, and clutching mechanism to engage it with and disengage it from the shaft, of feed-receptacles and agitators therefor, rotatable feeding devices mounted below said receptacles, respectively, to receive the feed therefrom, and interconnecting gearing between said agitators, rotatable feeders, and clutch-gear whereby both receptacles and their feeding devices are operated relatively to each other and thrown out of operation simultaneously.

5. In a cotton-planter, the combination, with a feed-receptacle having a discharge-opening, of a rotatable member having a transverse opening, and a dropper-block mounted to slide back and forth in said opening by its gravity alone as the said piece rotates, the said block being formed of two parts adjustably connected together.

6. In a cotton-planter, the combination, with a carrying-frame and main shaft, clutch-gears loosely mounted on said shaft, and clutching mechanism to connect and disconnect said gears, respectively, therewith, of a fertilizer and a seed-receptacle mounted in sets on said carrying-frame, feeding means for each receptacle, a hoe and a coverer for each feeder and carried by the frame, and agitators for each receptacle, interconnecting gear mechanism between said agitators, feeding means and their respective clutch-gears to drive therefrom or remain inoperative when said gear is unclutched, each clutch-gear being provided with a designating-mark corresponding to the operation of said feeders, whereby the observation of said marks will indicate whether the feeders are dropping simultaneously or otherwise.

In testimony whereof I affix my signature in presence of two witnesses.

THOMAS C. CADWGAN.

Witnesses:
CHARLES E. STROUT,
OSCAR E. HALL.